United States Patent
Chebiyyam

(10) Patent No.: US 8,621,008 B2
(45) Date of Patent: Dec. 31, 2013

(54) SYSTEM, METHOD AND COMPUTER PROGRAM PRODUCT FOR PERFORMING AN ACTION BASED ON AN ASPECT OF AN ELECTRONIC MAIL MESSAGE THREAD

(75) Inventor: Gopi Krishna Chebiyyam, Hyderabad (IN)

(73) Assignee: McAfee, Inc., Santa Clara, CA (US)

( * ) Notice: Subject to any disclaimer, the term of this patent is extended or adjusted under 35 U.S.C. 154(b) by 173 days.

(21) Appl. No.: 11/740,844

(22) Filed: Apr. 26, 2007

(65) Prior Publication Data

US 2013/0246534 A1     Sep. 19, 2013

(51) Int. Cl.
*G06F 15/16* (2006.01)

(52) U.S. Cl.
USPC ............ 709/206; 709/204; 709/205; 709/207

(58) Field of Classification Search
USPC ................................................ 709/204–207
See application file for complete search history.

(56) References Cited

U.S. PATENT DOCUMENTS

| | | |
|---|---|---|
| 5,280,527 A | 1/1994 | Gullman et al. |
| 5,572,694 A | 11/1996 | Uchino |
| 5,796,948 A | 8/1998 | Cohen |
| 5,845,068 A | 12/1998 | Winiger |
| 5,941,915 A | 8/1999 | Ferderle et al. |
| 5,987,610 A | 11/1999 | Franczek et al. |
| 6,073,142 A | 6/2000 | Geiger et al. |
| 6,367,019 B1 | 4/2002 | Ansell et al. |
| 6,460,050 B1 | 10/2002 | Pace et al. |
| 6,658,566 B1 | 12/2003 | Hazard |
| 6,718,367 B1 | 4/2004 | Ayyadurai |
| 6,741,851 B1 | 5/2004 | Lee et al. |
| 6,820,204 B1 | 11/2004 | Desai et al. |
| 6,934,857 B1 | 8/2005 | Bartleson et al. |
| 6,957,330 B1 | 10/2005 | Hughes |
| 6,961,765 B2 | 11/2005 | Terry |
| 7,023,816 B2 | 4/2006 | Couillard |
| 7,100,123 B1 | 8/2006 | Todd et al. |
| 7,124,197 B2 | 10/2006 | Ocepek et al. |
| 7,149,778 B1 | 12/2006 | Patel et al. |
| 7,194,623 B1 | 3/2007 | Proudler et al. |
| 7,194,728 B1 | 3/2007 | Sirota et al. |
| 7,257,707 B2 | 8/2007 | England et al. |
| 7,278,016 B1 | 10/2007 | Detrick et al. |

(Continued)

FOREIGN PATENT DOCUMENTS

| | | |
|---|---|---|
| GB | 2411330 | 8/2005 |
| WO | WO 02093410 | 11/2002 |
| WO | WO 2006/076536 | 7/2006 |

OTHER PUBLICATIONS

ClearContext, www.clearcontext.com/user_guide/, Nov. 7, 2006; retrieved from http://web.archive.org/web/20061107135010/http://www.clearcontext.com/user_guide/, pp. 1-24.*

(Continued)

*Primary Examiner* — Chau Le
(74) *Attorney, Agent, or Firm* — Patent Capital Group

(57) ABSTRACT

A system, method and computer program product are provided for performing an action based on an aspect of a thread associated with electronic mail messages. In use, an aspect of a thread associated with a plurality of electronic mail messages is identified. Further, an action is performed based on the aspect of the thread.

25 Claims, 6 Drawing Sheets

(56) References Cited

U.S. PATENT DOCUMENTS

| | | |
|---|---|---|
| 7,313,615 B2 | 12/2007 | Fitzpatrick et al. |
| 7,346,778 B1 | 3/2008 | Guiter et al. |
| 7,350,074 B2 | 3/2008 | Gupta et al. |
| 7,350,084 B2 | 3/2008 | Abiko et al. |
| 7,437,752 B2 | 10/2008 | Heard et al. |
| 7,461,249 B1 | 12/2008 | Pearson et al. |
| 7,475,420 B1 | 1/2009 | Hernacki |
| 7,484,247 B2 | 1/2009 | Rozman et al. |
| 7,490,355 B2 | 2/2009 | Wong |
| 7,506,155 B1 | 3/2009 | Stewart et al. |
| 7,519,984 B2 | 4/2009 | Bhogal et al. |
| 7,523,484 B2 | 4/2009 | Lum et al. |
| 7,526,654 B2 | 4/2009 | Charbonneau |
| 7,539,857 B2 | 5/2009 | Bartlett et al. |
| 7,559,080 B2 | 7/2009 | Bhargavan et al. |
| 7,581,004 B2 | 8/2009 | Jakobson |
| 7,630,986 B1 | 12/2009 | Herz et al. |
| 7,653,811 B2 | 1/2010 | Yagiura |
| 7,661,124 B2 | 2/2010 | Ramanathan et al. |
| 7,689,563 B1 | 3/2010 | Jacobson |
| 7,730,040 B2 | 6/2010 | Reasor et al. |
| 7,742,406 B1 | 6/2010 | Muppala |
| 7,877,616 B2 | 1/2011 | Abiko et al. |
| 7,890,587 B1 | 2/2011 | Chebiyyam |
| 7,940,756 B1 | 5/2011 | Duffy et al. |
| 8,103,727 B2 | 1/2012 | Lin |
| 8,111,413 B2 | 2/2012 | Nuggehalli et al. |
| 8,151,363 B2 | 4/2012 | Smithson |
| 8,181,036 B1 | 5/2012 | Nachenberg |
| 8,199,965 B1 | 6/2012 | Basavapatna et al. |
| 8,272,058 B2 | 9/2012 | Brennan |
| 8,353,053 B1 | 1/2013 | Chebiyyam |
| 8,446,607 B2 | 5/2013 | Zucker et al. |
| 2001/0046069 A1 | 11/2001 | Jones |
| 2002/0046275 A1 | 4/2002 | Crosbie et al. |
| 2002/0083003 A1 | 6/2002 | Halliday et al. |
| 2002/0099944 A1 | 7/2002 | Bowlin |
| 2002/0157089 A1 | 10/2002 | Patel et al. |
| 2003/0046679 A1 | 3/2003 | Singleton |
| 2003/0065937 A1 | 4/2003 | Watanabe et al. |
| 2003/0097583 A1 | 5/2003 | Lacan et al. |
| 2003/0105979 A1 | 6/2003 | Itoh et al. |
| 2003/0133443 A1 | 7/2003 | Klinker et al. |
| 2003/0135744 A1 | 7/2003 | Almeida |
| 2003/0177394 A1 | 9/2003 | Dozortsev |
| 2003/0182435 A1 | 9/2003 | Redlich et al. |
| 2003/0192033 A1 | 10/2003 | Gartside et al. |
| 2003/0233421 A1 | 12/2003 | Shibata et al. |
| 2004/0003255 A1 | 1/2004 | Apvrille et al. |
| 2004/0006715 A1 | 1/2004 | Skrepetos |
| 2004/0010686 A1 | 1/2004 | Goh et al. |
| 2004/0027601 A1 | 2/2004 | Ito et al. |
| 2004/0034794 A1 | 2/2004 | Mayer et al. |
| 2004/0054928 A1 | 3/2004 | Hall |
| 2004/0064732 A1 | 4/2004 | Hall |
| 2004/0088433 A1 | 5/2004 | Kaler et al. |
| 2004/0111482 A1 | 6/2004 | Bourges-Waldegg et al. |
| 2004/0117802 A1* | 6/2004 | Green ........................... 719/318 |
| 2004/0146006 A1 | 7/2004 | Jackson |
| 2004/0172557 A1 | 9/2004 | Nakae et al. |
| 2004/0199555 A1 | 10/2004 | Krachman |
| 2004/0199566 A1 | 10/2004 | Carlson et al. |
| 2004/0199596 A1 | 10/2004 | Nutkis |
| 2004/0230572 A1* | 11/2004 | Omoigui ........................... 707/3 |
| 2004/0255138 A1 | 12/2004 | Nakae |
| 2005/0033810 A1* | 2/2005 | Malcolm ........................ 709/206 |
| 2005/0038853 A1 | 2/2005 | Blanc et al. |
| 2005/0044359 A1 | 2/2005 | Eriksson et al. |
| 2005/0060643 A1 | 3/2005 | Glass et al. |
| 2005/0131990 A1 | 6/2005 | Jewell |
| 2005/0132184 A1 | 6/2005 | Palliyil et al. |
| 2005/0166066 A1 | 7/2005 | Ahuja et al. |
| 2005/0172140 A1 | 8/2005 | Ide |
| 2005/0198285 A1 | 9/2005 | Petit |
| 2005/0204009 A1* | 9/2005 | Hazarika et al. ............... 709/206 |
| 2005/0216749 A1 | 9/2005 | Brent |
| 2005/0262208 A1* | 11/2005 | Haviv et al. .................... 709/206 |
| 2005/0275861 A1 | 12/2005 | Ferlitsch |
| 2005/0289181 A1 | 12/2005 | Deninger et al. |
| 2006/0005244 A1 | 1/2006 | Garbow et al. |
| 2006/0010209 A1 | 1/2006 | Hodgson |
| 2006/0010217 A1* | 1/2006 | Sood ............................... 709/206 |
| 2006/0021043 A1 | 1/2006 | Kaneko et al. |
| 2006/0026593 A1* | 2/2006 | Canning et al. ................ 718/100 |
| 2006/0041930 A1 | 2/2006 | Hafeman et al. |
| 2006/0050879 A1 | 3/2006 | Iizuka |
| 2006/0059548 A1 | 3/2006 | Hildre et al. |
| 2006/0070089 A1 | 3/2006 | Shoaib et al. |
| 2006/0075040 A1* | 4/2006 | Chmaytelli .................... 709/206 |
| 2006/0075502 A1 | 4/2006 | Edwards |
| 2006/0112166 A1 | 5/2006 | Pettigrew et al. |
| 2006/0120526 A1 | 6/2006 | Boucher et al. |
| 2006/0123413 A1 | 6/2006 | Collet et al. |
| 2006/0123479 A1 | 6/2006 | Kumar et al. |
| 2006/0132824 A1 | 6/2006 | Aritomi |
| 2006/0168026 A1 | 7/2006 | Keohane et al. ............... 709/206 |
| 2006/0190986 A1 | 8/2006 | Mont |
| 2006/0224589 A1 | 10/2006 | Rowney et al. |
| 2006/0248252 A1 | 11/2006 | Kharwa |
| 2007/0022285 A1 | 1/2007 | Groth et al. |
| 2007/0028112 A1 | 2/2007 | Mackelden et al. |
| 2007/0033283 A1 | 2/2007 | Brown |
| 2007/0064883 A1 | 3/2007 | Rosenthal et al. |
| 2007/0074292 A1 | 3/2007 | Mimatsu |
| 2007/0094394 A1 | 4/2007 | Singh et al. |
| 2007/0101419 A1 | 5/2007 | Dawson |
| 2007/0110089 A1 | 5/2007 | Essafi et al. |
| 2007/0118904 A1 | 5/2007 | Goodman et al. |
| 2007/0136593 A1 | 6/2007 | Plavcan et al. |
| 2007/0143472 A1* | 6/2007 | Clark et al. .................... 709/206 |
| 2007/0143851 A1 | 6/2007 | Nicodemus et al. |
| 2007/0174909 A1 | 7/2007 | Burchett et al. |
| 2007/0214220 A1 | 9/2007 | Alsop et al. |
| 2007/0220319 A1 | 9/2007 | Desai et al. |
| 2007/0245148 A1 | 10/2007 | Buer |
| 2007/0279668 A1 | 12/2007 | Czyszczewski et al. |
| 2007/0280112 A1 | 12/2007 | Zheng et al. |
| 2008/0034224 A1 | 2/2008 | Ferren et al. |
| 2008/0040358 A1 | 2/2008 | Deng |
| 2008/0065882 A1 | 3/2008 | Goodman et al. |
| 2008/0065903 A1 | 3/2008 | Goodman et al. |
| 2008/0079730 A1 | 4/2008 | Zhang et al. |
| 2008/0083037 A1 | 4/2008 | Kruse et al. |
| 2008/0120689 A1 | 5/2008 | Morris et al. |
| 2008/0170785 A1 | 7/2008 | Simmons et al. |
| 2008/0208988 A1* | 8/2008 | Khouri et al. .................. 709/206 |
| 2008/0229428 A1 | 9/2008 | Camiel |
| 2008/0279381 A1 | 11/2008 | Narendra et al. |
| 2008/0309967 A1 | 12/2008 | Ferlitsch et al. |
| 2009/0055536 A1 | 2/2009 | Jo |
| 2009/0086252 A1 | 4/2009 | Zucker et al. |
| 2009/0172786 A1 | 7/2009 | Backa |
| 2009/0182931 A1 | 7/2009 | Gill et al. |
| 2009/0232300 A1 | 9/2009 | Zucker et al. |
| 2009/0327743 A1 | 12/2009 | Finlayson et al. |
| 2010/0174784 A1* | 7/2010 | Levey et al. ................... 709/206 |
| 2011/0167265 A1 | 7/2011 | Ahuja et al. |
| 2011/0273554 A1 | 11/2011 | Su et al. |
| 2012/0011189 A1 | 1/2012 | Werner et al. |
| 2012/0183174 A1 | 7/2012 | Basavapatna et al. |
| 2012/0191792 A1 | 7/2012 | Chebiyyam |

OTHER PUBLICATIONS

Dabbish et al., Understanding Email Use: Predicting Action on a Message, Apr. 2005, Retrieved from http://www.cs.cmu.edu/~kraut/RKrautsite.files/articles/dabbish05-UnderstandingEmailUse.pdf, pp. 1-10.*

Fumera, G. et al., "Spam Filtering Based on the Analysis of Text Information Embedded into Images," Journal of Machine Learning Research, Dec. 2006.

U.S. Appl. No. 11/349,479, filed Feb. 6, 2006.

Non-Final Rejection in U.S. Appl. No. 11/349,479 mailed on Dec. 8, 2008.

(56) References Cited

OTHER PUBLICATIONS

Response to Non-Final Action dated Dec. 8, 2008 in U.S. Appl. No. 11/349,479, filed Mar. 9, 2009.
Final Rejection in U.S. Appl. No. 11/349,479 mailed on Jun. 10, 2009.
Notice of Appeal in U.S. Appl. No. 11/349,479, filed Dec. 10, 2009.
Appeal Brief filed in U.S. Appl. No. 11/349,479, filed Dec. 10, 2009.
Examiner Interview Summary in U.S. Appl. No. 11/349,479 mailed on Feb. 5, 2010.
Non-Final Rejection in U.S. Appl. No. 11/349,479 mailed on Mar. 22, 2010.
Response to Non-Final Action dated Mar. 22, 2010 in U.S. Appl. No. 11/349,479, filed Jul. 22, 2010.
Notice of Allowance in U.S. Appl. No. 11/349,479 mailed on Nov. 8, 2010.
U.S. Appl. No. 11/473,930, filed Jun. 23, 2006.
Non-Final Office Action in U.S. Appl. No. 11/473,930 mailed on Aug. 17, 2009.
Response to Non-Final Office Action dated Aug. 17, 2009 in U.S. Appl. No. 11/473,930, filed Nov. 17, 2009.
Non-Final Office Action in U.S. Appl. No. 11/473,930 mailed on Jan. 26, 2010.
Response to Non-Final Office Action dated Jan. 26, 2010 in U.S. Appl. No. 11/473,930, filed Apr. 26, 2010.
Non-Final Office Action in U.S. Appl. No. 11/473,930 mailed on Jul. 16, 2010.
Response to Non-Final Office Action dated Jul. 16, 2010 in U.S. Appl. No. 11/473,930, filed Dec. 16, 2010.
Non-Final Office Action in U.S. Appl. No. 11/473,930 mailed on Mar. 10, 2011.
Response to Non-Final Action dated Mar. 10, 2011 in U.S. Appl. No. 11/473,930, filed Jun. 10, 2011.
U.S. Appl. No. 11/546,745, filed Nov. 29, 2006.
Non-Final Office Action in U.S. Appl. No. 11/546,745 mailed Nov. 2, 2009.
Response to Non-Final Office Action mailed on Nov. 2, 2009 U.S. Appl. No. 11/546,745, filed Feb. 2, 2010.
Non-Final Office Action in U.S. Appl. No. 11/546,745 mailed on Apr. 21, 2010.
Response to Non-Final Office Action mailed on Apr. 21, 2010 in U.S. Appl. No. 11/546,745, filed Jul. 21, 2010.
Final Office Action in U.S. Appl. No. 11/546,745 mailed on Oct. 21, 2010.
Request for Continued Examination and Amendment in U.S. Appl. No. 11/546,745, filed Feb. 22, 2011.
U.S. Appl. No. 11/840,831, filed Aug. 17, 2007.
Non-Final Office Action in U.S. Appl. No. 11/840,831 mailed on Oct. 12, 2010.
Response to Non-Final Action dated Oct. 12, 2010 in U.S. Appl. No. 11/840,831, filed Feb. 14, 2011.
Final Office Action in U.S. Appl. No. 11/840,831 mailed on May 5, 2011.
Non-Final Office Action in U.S. Appl. No. 11/905,420 mailed on May 23, 2011.
Non-Final Office Action in U.S. Appl. No. 12/076,163 mailed on Apr. 28, 2011.
Non-Final Office Action in U.S. Appl. No. 12/187,207 mailed on Mar. 25, 2011.
U.S. Appl. No. 11/850,432, filed Sep. 5, 2007.
U.S. Appl. No. 12/123,370, filed May 19, 2008.
U.S. Appl. No. 12/102,526, filed Apr. 14, 2008.
Request for Continued Examination and Amendment in U.S. Appl. No. 11/840,831, filed Jul. 5, 2011.
Response to Non-Final Action dated Mar. 25, 2011 in U.S. Appl. No. 12/187,207, filed Jun. 27, 2011.
U.S. Appl. No. 11/210,321, filed Aug. 23, 2005.
Request for Continued Examination and Amendment in U.S. Appl. No. 11/473,930, filed Nov. 14, 2011.
Final Office Action in U.S. Appl. No. 11/905,420 mailed on Nov. 2, 2011.
Request for Continued Examination in U.S. Appl. No. 12/187,207, filed Nov. 11, 2011.
Final Office Action in U.S. Appl. No. 11/473,930 mailed on Sep. 14, 2011.
Non-Final Office Action in U.S. Appl. No. 11/840,831 mailed on Jul. 21, 2011.
Response to Non-Final Action dated Jul. 21, 2011 in U.S. Appl. No. 11/840,831, filed Oct. 19, 2011.
Response to Non-Final Action dated May 23, 2011 in U.S. Appl. No. 11/905,420, filed Aug. 22, 2011.
Response to Non-Final Office Action dated Apr. 28, 2011 in U.S. Appl. No. 12/076,163, filed Jul. 28, 2011.
Final Office Action in U.S. Appl. No. 12/076,163 mailed on Oct. 19, 2011.
Notice of Allowance in U.S. Appl. No. 12/187,207 mailed on Aug. 24, 2011.
Non-Final Office Action in U.S. Appl. No. 11/473,930 mailed on Mar. 1, 2012.
Non-Final Office Action in U.S. Appl. No. 11/564,745 mailed on Jan. 19, 2012.
Final Office Action in U.S. Appl. No. 11/840,831 mailed on Dec. 21, 2011.
Request for Continued Examination and Response in U.S. Appl. No. 11/840,831, filed Feb. 21, 2012.
Notice of Allowance in U.S. Appl. No. 11/840,831 mailed on Mar. 16, 2012.
Request for Continued Examination in U.S. Appl. No. 11/840,831 filed Mar. 22, 2012.
Notice of Allowance in U.S. Appl. No. 11/840,831 mailed on Apr. 3, 2012.
U.S. Appl. No. 13/429,363 entitled "System, Method, and Computer Program Product for Preventing Image-Related Data Loss", filed on Mar. 24, 2012.
Request for Continued Examination and Amendment in U.S. Appl. No. 11/905,420 filed Jan. 3, 2012.
Request for Continued Examination and Amendment in U.S. Appl. No. 12/076,163, filed Jan. 19, 2012.
U.S. Appl. No. 13/434,777, filed Mar. 29, 2012, entitled "System, Method, and Computer Program Product for Determining Whether an Electronic Mail Message is Compliant with an Etiquette Policy", Inventor Gopi Krishna Chebiyyam.
Response to Non-Final Office Action dated Mar. 1, 2012 in U.S. Appl. No. 11/473,930, filed May 29, 2012.
Response to Non-Final Office Action dated Jan. 19, 2012 in U.S. Appl. No. 11/564,745, filed Apr. 16, 2012.
Final Office Action in U.S. Appl. No. 11/564,745 mailed on Jun. 4, 2012.
Request for Continued Examination in U.S. Appl. No. 11/840,831, filed Apr. 27, 2012.
Notice of Allowance in U.S. Appl. No. 11/840,831 mailed on May 9, 2012.
Layland, Robin, "Data Leak Prevention: Coming Soon to a Business Near You," Business Communications Review, May 2007 (pp. 44-49).
Heikkila, Faith M., "Encryption: Security Considerations for Portable Media Devices," IEEE Computer Society, IEEE Security & Privacy, Jul./Aug. 2007 (pp. 22-27).
Final Office Action in U.S. Appl. No. 11/473,930 mailed on Aug. 8, 2012.
Request for Continued Examination and Amendment to in U.S. Appl. No. 11/473,930, filed Nov. 7, 2012.
Request for Continued Examination and Amendment in U.S. Appl. No. 11/564,745, filed Aug. 6, 2012.
Non-Final Office Action in U.S. Appl. No. 11/905,420 mailed on Jul. 23, 2011.
Response to Non-Final Office Action dated Jul. 23, 2012 in U.S. Appl. No. 11/905,420, filed Oct. 23, 2012.
Non-Final Office Action in U.S. Appl. No. 12/076,163 mailed on Sep. 4, 2012.
Notice of Allowance in U.S. Appl. No. 12/187,207 mailed on Sep. 11, 2012.
Non-Final Office Action in U.S. Appl. No. 13/434,777 mailed on Aug. 20, 2012.

(56) References Cited

OTHER PUBLICATIONS

Non-Final Office Action in U.S. Appl. No. 11/473,930 mailed on Feb. 4, 2013.
Response to Non-Final Office Action dated Feb. 4, 2013 in U.S. Appl. No. 11/473,930, filed May 6, 2013.
Final Office Action in U.S. Appl. No. 11/473,930 mailed on Jul. 16, 2013.
Non-Final Office Action in U.S. Appl. No. 11/564,745 mailed on Apr. 5, 2013.
Notice of Allowance in U.S. Appl. No. 11/905,420 mailed on Dec. 6, 2012.
Response to Non-Final Office Action dated Sep. 4, 2012 in U.S. Appl. No. 12/076,163, filed Dec. 4, 2012.
Final Office Action in U.S. Appl. No. 12/076,163 mailed on Mar. 25, 2013.
Request for Continued Examination in U.S. Appl. No. 12/187,207, filed Dec. 11, 2012.
Response to Non-Final Office Action dated Aug. 20, 2012 in U.S. Appl. No. 13/434,777, filed Nov. 20, 2012.
Final Office Action in U.S. Appl. No. 13/434,777 mailed on Feb. 12, 2013.
Request for Continued Examination in U.S. Appl. No. 13/434,777 filed on Apr. 15, 2013.
Non-Final Office Action in U.S. Appl. No. 13/434,777 mailed on May 23, 2013.
Non-Final Office Action in U.S. Appl. No. 12/102,526 mailed on Nov. 24, 2010.
Response to Non-Final Office Action dated Nov. 24, 2010 in U.S. Appl. No. 12/102,526, filed Mar. 9, 2011.
Final Office Action in U.S. Appl. No. 12/102,526 mailed on May 25, 2011.
After Final Response to Final Office Action dated May 25, 2011 in U.S. Appl. No. 12/105,526, filed Jul. 13, 2011.
Advisory Action in U.S. Appl. No. 12/102,526 mailed Aug. 1, 2011.
Request for Continued Examination in U.S. Appl. No. 12/102,526, filed Aug. 25, 2011.
Notice of Allowance in U.S. Appl. No. 12/102,526 mailed on Sep. 21, 2013.

\* cited by examiner

SYSTEM, METHOD AND COMPUTER PROGRAM PRODUCT FOR PERFORMING AN ACTION BASED ON AN ASPECT OF AN ELECTRONIC MAIL MESSAGE THREAD

FIELD OF THE INVENTION

The present invention relates to electronic mail messages, and more particularly to managing electronic mail message threads.

BACKGROUND

A threaded discussion, or thread, refers to the grouping of a plurality of messages, for example, electronic mail messages. An electronic mail message sent between members of a group of two or more people may trigger electronic mail messages from the group in response to the original electronic mail message, thereby creating an electronic mail message thread. Discussion, argument, debate, etc. within the group often results in electronic mail message threads which contain large quantities of electronic mail messages.

The larger an electronic mail message thread becomes, the more difficult it is for group members to follow what is being discussed, decided, etc in the thread. Additionally, very often the larger the electronic mail message thread, the more impatient and/or impolite group members' responses to the thread become. Further, in a business environment, large electronic mail message threads may negatively impact productivity, as employees in the thread group may spend a significant amount of time and effort viewing and responding to electronic mail messages in a thread when other communication mediums, such as telephone conferences, meetings, etc. may be a more efficient form of communicating.

There is thus a need for addressing these and/or other issues associated with the prior art.

SUMMARY

A system, method, and computer program product are provided for performing an action based on an aspect of a thread associated with electronic mail messages. In use, an aspect of a thread associated with a plurality of electronic mail messages is identified. Further, an action is performed based on the aspect of the thread.

DETAILED DESCRIPTION

Figure 1:
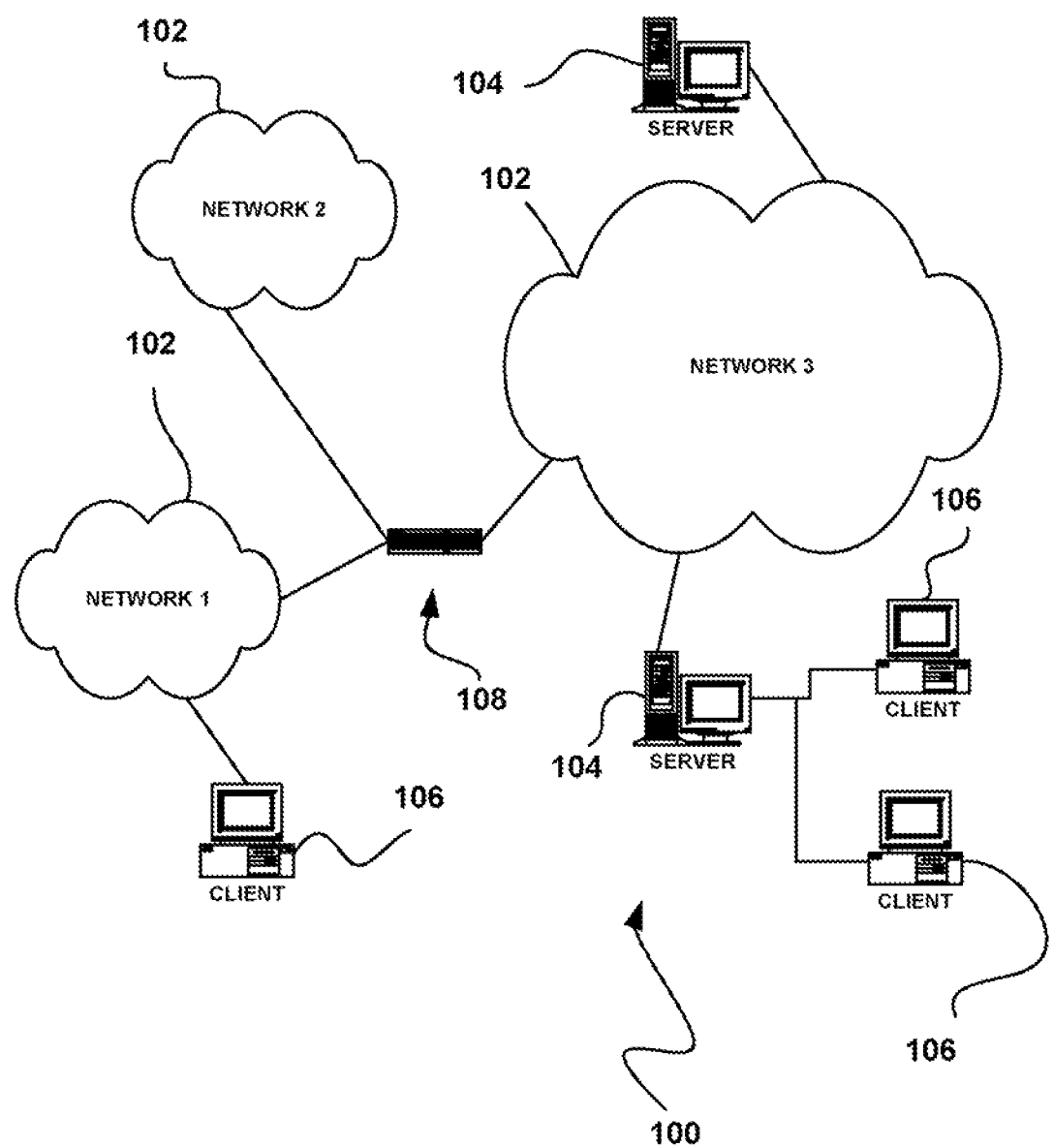
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g., printer, etc.), any component of a computer, and/or any other type of logic. In order to facilitate communication among the networks 102, at least one gateway 108 is optionally coupled therebetween.

Figure 2:
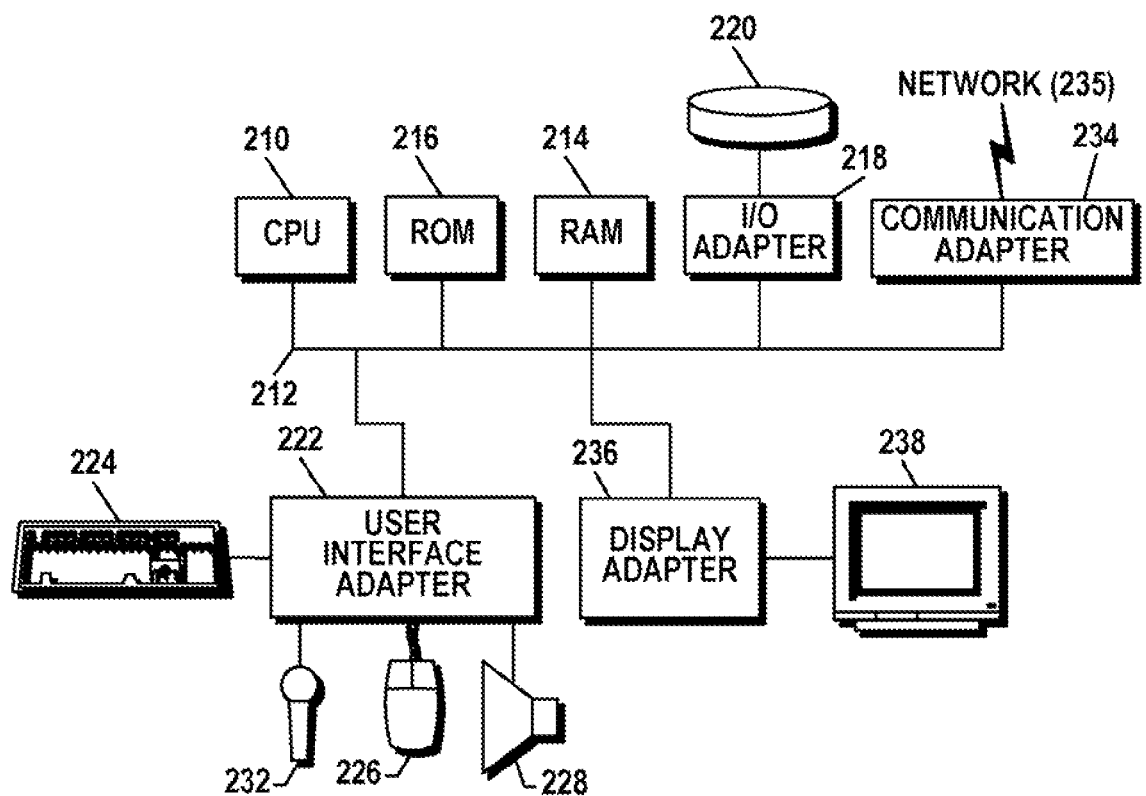
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
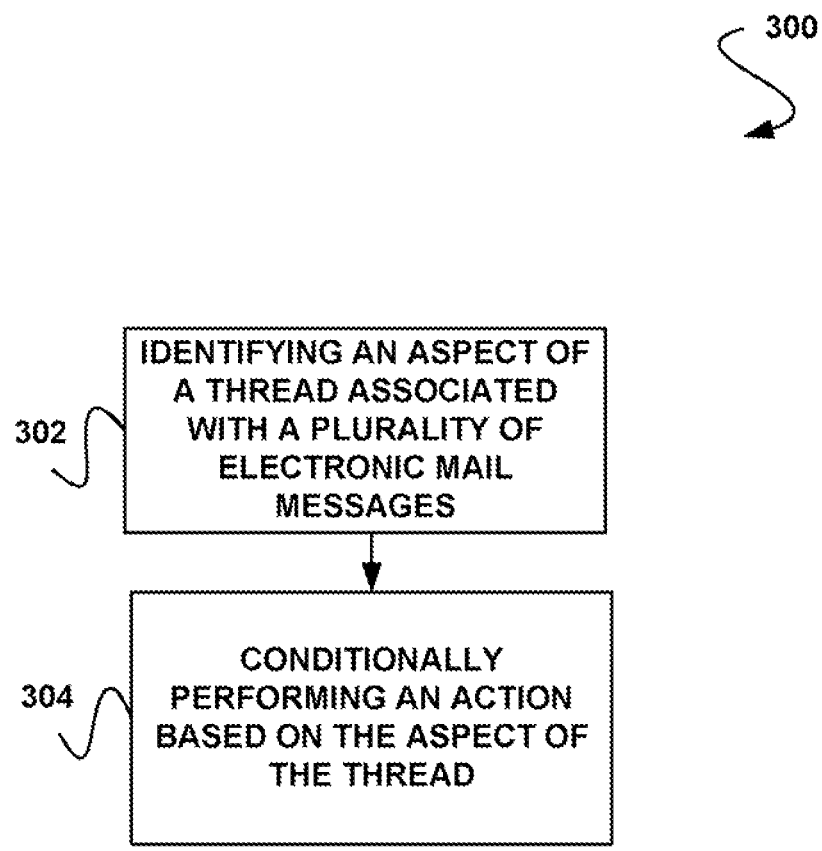
FIG. 3 shows a method for performing an action based on an aspect of a thread associated with electronic mail messages, in accordance with one embodiment.

FIG. 3 shows a method 300 for performing an action based on an aspect of a thread associated with electronic mail messages, in accordance with one embodiment. As an option, the method 300 may be carried out in the context of the architecture and environment of FIGS. 1 and/or 2. Of course, however, the method 300 may be carried out in any desired environment.

As shown, an aspect of a thread associated with a plurality of electronic mail messages is identified. See operation 302. In the context of the present description, the electronic mail messages may include any mail messages capable of being communicated electronically. For example, the electronic mail messages may be capable of being communicated between various devices including, for example, any of the servers and/or clients described above with respect to FIGS. 1 and/or 2. Also, the electronic mail messages may optionally be capable of being communicated over a network (e.g. such as any of the networks described above with respect to FIG. 1). Non-exhaustive examples of electronic mail messages include, but are certainly not limited to e-mail, instant messages, text messages, etc.

In one embodiment, the electronic mail message may be associated with an electronic mail application. For example, such electronic mail application may include an electronic mail manager. In another embodiment, the electronic mail application may be utilized for generating, sending, receiving, viewing, etc. electronic mail messages.

Further, the thread may include any object associated with multiple electronic mail messages. In one embodiment, the thread may include a first electronic mail message and a second electronic message communicated in response to the first electronic mail message. Of course, it should be noted that the thread may be associated with any desired number of electronic mail messages. To this end, the thread may include multiple electronic mail messages, and further the contents within such electronic mail messages. In addition, the thread may be communicated between various devices (e.g. computers, etc.).

In one embodiment the aspect of the thread may include a size of the thread. As an option, the size of the thread may optionally include a physical size of the thread (e.g. in kilobytes, etc.). Further, the size of the thread may be based on sizes of the associated electronic mail messages. In another embodiment, the aspect of the thread may include a number of electronic mail messages associated with the thread. In yet another embodiment, the aspect of the thread may include a number of words in the electronic mail messages associated with the thread.

In still yet another embodiment, the aspect of the thread may include participants associated with the thread and/or a number of participants associated with the thread For example, the participants may each include a different electronic mail address. As another option, the number of participants may only be based on the number of participants of a latest electronic mail message (e.g. a mail message most, recently requested to be communicated, etc.) associated with the thread.

As yet another option, the number of participants may be based on a number of participants added to the thread (e.g. added to an electronic, mail message subsequent to an original electronic mail message associated with the thread) and/or a number of participants removed from the thread (e.g. removed from an electronic mail message subsequent to the original electronic mail message associated with the thread), etc. As an additional option, the number of participants may be based on a number of direct addressees and/or indirect [e.g. carbon-copied (CC'd)] addressees in any of the electronic mail messages associated with the thread. Also, a weight given to direct addressees may be different from a weight given to indirect addressees when identifying a number of participants associated with the thread.

Still yet, in other embodiments, the number of participants may be based on participants who respond and/or reply to an electronic mail message associated with the thread. For example, a weight given to active participants (e.g. those who reply and/or respond to one or more electronic mail messages associated with the thread) may be different than the weight given to inactive participants (e.g. those who do not reply and/or respond to one or more electronic mail messages associated with the thread) when identifying a number of participants associated with the thread.

Still yet, predetermined participants (e.g. individual participants, groups associated with multiple participants, etc.) may be prevented from being included in the identified number of participants associated with the thread. Of course, it should be noted that, while various examples of the aspect of the thread are described herein, the aspect of the thread may include any attribute, characteristic, and/or trait capable of being associated with the thread.

In one optional embodiment, the aspect of the thread may be identified based on an analysis of one or more of the electronic mail messages associated with the thread. For example, a subject, header, body, message identifier (ID), etc., and/or any other portion of one or more of such electronic mail messages may be analyzed in order to identify the aspect of the thread.

In another embodiment, the aspect of the thread may be identified in response to a request to communicate the thread (e.g. over a network, etc.). For example, the aspect of the thread may be identified in response to a user selection to send the thread (e.g. attached to a particular mail message being sent, etc.). In another embodiment, the aspect of the thread may be identified during communication of the thread from a source device to a different destination device. Of course, however, the aspect of the thread may be identified at any desired time and in any desired manner.

As also shown, an action is conditionally performed based on the aspect of the thread. See operation 304. In one embodiment, the aspect of the thread may optionally be compared to a threshold, such that the action may or may not be performed based on the comparison. The threshold may be configured in any desired manner (e.g. manually, automatically, utilizing a user interface, etc.).

For example, if it is determined that the aspect meets and/or exceeds the threshold, the action may be performed. Thus, the threshold may be a minimum value, but of course may also be a maximum value, or any value of significance for purposes of comparison. Just by way of example, the number of participants associated with a particular thread may be compared to a predetermined maximum number of allowable participants in order to determine whether an excessive amount of participants are associated with a particular thread.

As an option, different thresholds may be used for purposes of comparison in threads associated with a small number of participants (e.g. two, three, etc.) as opposed to threads with a larger number of participants (e.g. three or more, etc.). For example, with respect to threads associated with a small number of participants, a number of electronic mail messages associated with the thread may be compared to a first threshold. On the other hand, with respect to threads associated with a larger number of participants, the number of electronic mail messages associated with the thread may be compared to a second different threshold.

In another embodiment, the action may be prevented from being performed if the aspect of the thread matches a predetermined aspect. For example, if a participant of the thread matches a predetermined participant, a group of participants matches a predetermined group of participants, etc., the action may not necessarily be performed. In this way, predetermined participants may be authorized to communicate threads with aspects for which an action would otherwise be performed.

Additionally, the action may, in one embodiment, include removing at least a portion of the thread. For example, the portion of the thread removed may include at least one of the electronic mail messages associated with the thread. Thus, upon an aspect of the thread reaching a predetermined threshold, a certain number of electronic mail messages may be removed from the thread.

In another embodiment, for example, it may be determined that a particular number of electronic mail messages are associated with a thread, and it may be further determined that a latest electronic mail message associated with the thread contains the body of each of the other previous electronic mail messages. To this end, one or more of the other previous electronic mail messages may be removed from the thread. Thus, as an option, storage space may be saved, in addition to saving time spent by participants (or users associated therewith) of the thread searching for information therein.

In one optional embodiment, one or more portions removed from the thread may be temporarily stored (e.g. for a predetermined time period). Such storage may occur, for example, on a local hard disk, network server, etc. In this way, the removed stored portions of the thread may be restored to the thread as desired (e.g. in response to a user request, etc.).

Just by way of example, if an electronic mail message containing an attachment is removed from an associated thread, the attachment and/or the entire electronic mail message may be stored for a predetermined time period. To this end, it may later be determined that access to the attachment and/or text of the removed electronic mail message is desired, such that the removed electronic mail message may be restored to the thread. This may optionally help ensure that the deletion of one or more electronic mail messages does not result in the loss of information. In another optional embodiment, electronic mail messages containing file attachments may be exempted from such removal.

Further still, in another embodiment, the action may include preventing the communication of one or more additional electronic mail messages in association with the thread. For example, an electronic mail message sent as a reply to an existing electronic mail message associated with the thread may be prevented from being delivered to an associated intended destination. Additionally, a sender of such electronic mail message may be alerted that the electronic mail message was not sent. For example, a copy of the unseat electronic mail message and/or a predetermined generalized message may be delivered to the sender of the unsent electronic mail message.

In yet another embodiment the action may include sending a notification to a predetermined destination. For example, the predetermined destination may be one or more of an electronic mail message address, fax number, or any other destination capable of receiving a notification. To this end, the action may include sending an electronic mail message notification. Further, the predetermined destination may be associated with an administrator, a manager, at least, one participant associated with the thread, etc.

Thus, in one optional embodiment, the action performed may include sending a notification to one or more of the participants associated with the thread. The participants may include an originator of the thread, thread contributors, thread recipients (including direct and/or indirect addressees), and/or any participant associated with the thread.

Just by way of example, if a particular threshold has been met, the thread may be allowed to be communicated to a desired destination, while an electronic mail message notification may be sent to participants who authored an electronic mail message associated with the particular thread. This may optionally notify contributors to the thread that the thread may be growing in size too quickly, and that an alternative forum, for example, a conference, phone meeting, etc. should be utilized in order to further discuss the thread topic.

As another option, if the ratio between a number of active participants and a number of the inactive participants meets (or exceeds) a predetermined amount, the action may include sending an electronic mail message notification to the active, and optionally inactive, participants in order to inform such participants to continue the communications offline. As yet another option, the electronic mail message notification may be directly sent to the active participants, and indirectly sent (e.g. CC'd) to the inactive participants.

Additionally, in one optional embodiment, the action performed may include logging the aspect of the thread. Such logging may include retrieving information associated with the thread (e.g. from one or more of the electronic mail messages associated with the thread, etc.), and storing such information on a local hard disk, network server, database, or other storage medium. For example, if the number of electronic mail messages associated with a thread surpasses a certain threshold, the number of electronic mail messages in the thread may be logged, along with the active participants in the thread. The information may be used for reporting, statistics, strategic, or other purposes.

While various actions are described herein, it should be noted that any desired manual or automated action may be performed based on the aspect of the thread. Additionally, any number of actions may be simultaneously or sequentially performed based on the aspect of the thread. For example, an electronic mail message notification may be sent to a predetermined destination, and communication of one or more electronic mail messages associated with the thread may be prevented.

Also, in yet another embodiment the action performed may be tailored based on the number of participants associated with the thread. As an option, a less severe action, such as sending an electronic mail message notification, may be performed for threads involving a smaller number of participants. For example, an electronic mail message notification may be utilized for personal communications between two participants of a thread. However, threads involving a larger number of participants may result in more severe actions, such as removing a portion of the thread or preventing the communication of additional electronic mail messages in association with the thread.

Thus, the action may be performed based on the aspect of the thread associated with the electronic mail messages. As an option, the action may be performed for improving a work; environment. For example, the action may be utilized for preventing or limiting threads with particular aspects associated therewith.

Thus, the action may optionally be utilized for filtering threads and/or electronic mail messages associated therewith. Just by way of example, the action may be performed by a mail thread filter (MTF) Further, such mail thread filter may be utilized in conjunction with any other desired types of filters, such an anti-virus filter, an anti-spam filter, a content filter, a file filter, etc, More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
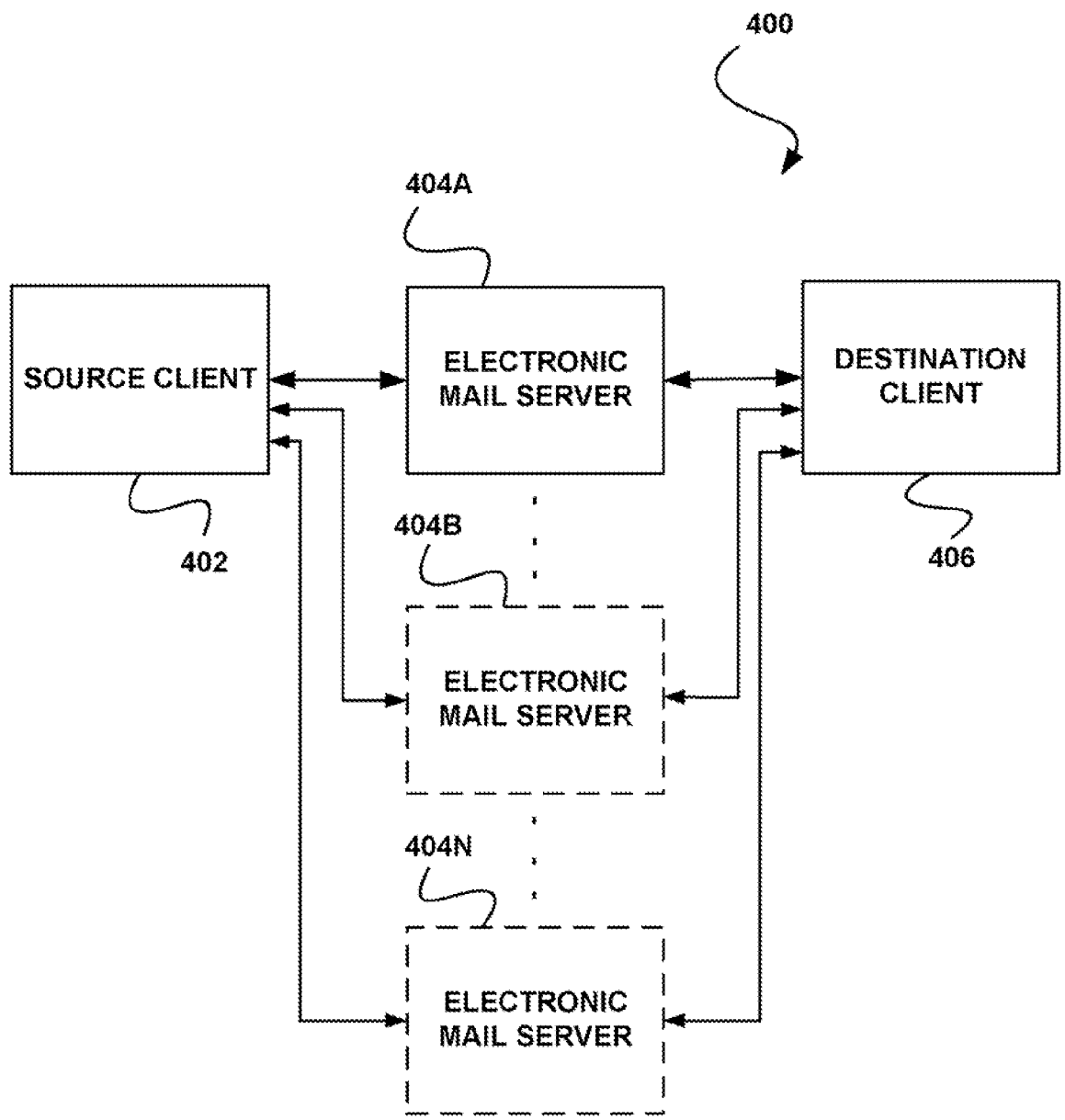
FIG. 4 shows a system for performing an action based on an aspect of a thread associated with electronic mail messages, in accordance with another embodiment.

FIG. 4 shows a system 400 for performing an action based on an aspect of a thread associated with electronic mail messages, in accordance with another embodiment. As an option, the system 400 may be implemented in the context of the architecture and environment of FIGS. 1-3 Of course, however, the system 400 may be implemented in any desired environment. While a server-based embodiment is set forth in FIG. 4, it should be noted that client-based solutions are contemplated as well. It should also be noted that the aforementioned definitions may apply during the present description.

As illustrated, the system 400 includes a source client 402. The source client 402 may comprise a computer workstation, internet kiosk, personal digital assistant (PDA), any of the other client devices described above with respect to FIGS. 1 and/or 2, and/or any other hardware or software capable of communicating a thread associated with electronic mail messages. In addition, the source client 402 may include an electronic mail application utilized in communicating the thread. In one optional embodiment, multiple source clients (not shown) may each communicate threads.

Additionally, the system 400 includes a destination client 406. In one embodiment, the destination client 406 may be the intended recipient of a thread communicated by the source client 402. Similar to the source client 402, the destination client 406 may also include any hardware or software device capable of receiving a thread associated with electronic mail messages.

In one embodiment, multiple destination clients (not shown) may each receive electronic mail messages which are associated with one or more threads. Optionally, the multiple destination clients may be the intended recipients of a single thread communicated by the source client 402. In another embodiment, multiple destination clients may be the intended recipients of multiple threads communicated by multiple source clients Further, the system 400 includes one or more electronic mail servers 404A-N. The electronic mail servers 404A-3N may each include any server device capable of performing an action based on an aspect of thread. For example, the electronic mail servers 404A-N may include any of the server devices described above with respect to FIGS. 1 and/or 2.

In one embodiment, the electronic mail servers 404A-N may each interface (e.g. monitor, control, etc.) the communications between the source client 402 and the destination client 406. For example, the electronic mail servers 404A-N may intercept deliver, relay, or otherwise transfer threads from the source client 402 to the destination client 406.

In another embodiment, the electronic mail servers 404A-N may analyze the threads communicated between the source client 402 and the destination client 406 for identifying aspects of such threads. For example, a thread communicated by the source client 402 to the destination client 406 may be analyzed by one of the electronic mail servers 494A-N in order to identify at least one aspect of the thread.

In one example of use, a first electronic mail server 404A may conditionally perform an action based on an identified aspect of the thread. In one embodiment, the first electronic mail server 404A may compare the identified aspect to a predetermined threshold. In another embodiment, the first electronic mail server 404A may perform the action based on the comparison For example, if the first electronic mail server 404A determines that the aspect of the thread meets (or exceeds) the threshold, the first electronic mail server 404A may perform an action. In various embodiments, the first electronic mail server 404A-N may block threads communicated from the source client 402 to the destination client 406, may send an electronic mail message notification to the source client 402 and/or the destination client 406, etc.

In yet another embodiment, one or more modules may be integrated with or otherwise coupled to the electronic mail servers 404A-N. Additionally, the modules may perform the aforementioned interfacing of the threads communicated between the source client 402 and the destination client 406. As an option, modules may be used to identify an aspect of a thread associated with electronic mail messages, and the modules may further perform an action based on the identified aspect.

In another embodiment, the electronic mail servers 404A-N may keep track of threads exchanged between the source client 402 and the destination client 406, such that when a number of electronic mail messages associated with a single thread exceeds a predefined threshold, an action may be performed. For example, an electronic mail message notification may be sent to a predetermined address, such as the electronic mail message of a senior manager. Additionally, an electronic mail message may be sent to participants associated with the thread (e.g. for providing a warning that the thread has become excessively long, etc). Additionally, the threshold may optionally be configurable (e.g. user configurable, etc.).

Figure 5:
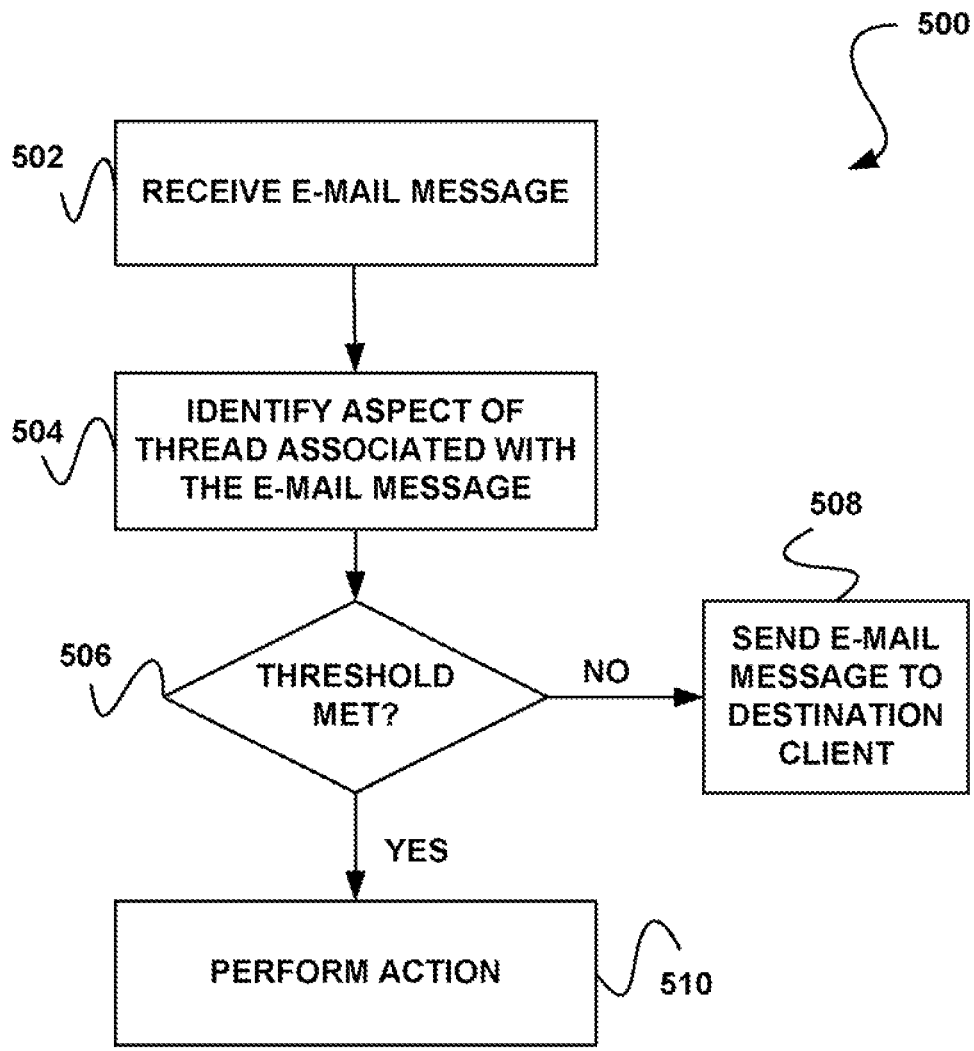
FIG. 5 shows a method for performing an action based on a comparison of a threshold to an aspect of a thread associated with electronic mail messages, in accordance with yet another embodiment.

FIG. 5 shows a method 500 for performing an action based on a comparison of a threshold to an aspect of a thread associated with electronic mail messages, in accordance with yet another embodiment. As an option, the method 500 may be carried out in the context of the architecture and environment of FIGS. 1-4 Of course, however, the method 500 may be carried out in any desired environment. It should also be noted that the aforementioned definitions may apply during the present description As shown, an electronic mail message is received in operation 502. In the present embodiment, the electronic mail message is associated with a thread of electronic mail messages. In one embodiment, an electronic mail server (e.g. one of the electronic mail servers 404A-N of FIG. 4) may receive the electronic mail message from a source client (e.g. source client 402 of FIG. 4).

Further, in operation 504, an aspect of the thread associated with the electronic mail message is identified. The aspect may include any desired aspect capable of being associated with the electronic, mail message. Just by way of example, the electronic mail server may determine a number of electronic mail messages associated with the thread.

As an option, the present operation 502 may not necessarily be applied to each and every thread and/or an entire thread. For example, particular participants may not necessarily be considered when identifying the aspect of the thread. As another example, particular electronic mail messages associated with the thread may not necessarily be considered when identifying the aspect of the thread (e.g. such as a number of electronic mail messages associated therewith, etc.). Such excluded data may be predefined, as an option. Just by way of example, threads originating from an electronic mail message communicated by a manager may be excluded when identifying any aspects and/or analyzing the same. In this way, actions., as described below, may not necessarily be performed on threads associated with such predetermined data.

Additionally, in decision 506, it is determined whether a particular threshold is met. In one embodiment, the threshold may be associated with the identified aspect of the thread. For example, the number of electronic mail messages associated with the thread may be compared with a threshold that includes a maximum number of electronic mail messages to be permitted in association with a single thread.

If it is determined that the threshold is not met in operation 506, the electronic mail message is sent to a destination client (e.g. destination client 406 of FIG. 4). See operation 508. The destination client may be designated within the electronic mail message. In the context of the example described above, if the number of electronic mail messages associated with the thread is determined to be lower than the maximum number of electronic mail messages permitted, the electronic mail message and the associated thread may be communicated to the destination client (operation 508). For example, the electronic mail server may communicate the electronic mail message to the destination client.

However, if it is determined that the threshold is met in operation 506, an action is performed See operation 510. For example, the action may be based on the particular aspect determined to meet the threshold. Just by way of example, if the number of electronic mail messages associated with the thread is determined to meet or exceed the maximum number of electronic mail messages allowed, the electronic mail server may not send the electronic mail message and associated thread to the destination client, may remove other electronic mail messages within the thread before sending the thread to the destination client, may alert the source client that the threshold has been exceeded, etc.

Additionally, as an option, various reports may be generated. In one embodiment, a mail thread statistics report may be generated for reporting a number of threads that have met or exceeded a particular threshold (or optionally a plurality of different thresholds) over a predefined time period (e.g. a week, a month, etc.). The particular threshold may be associated with a number of electronic mail messages in the thread, a number of participants in the thread, a size of electronic mail messages in the thread, etc.

Furthermore, in another embodiment, a user (e.g. employee, etc.) statistics report may be generated. For example, a number of times threads communicated by a particular user have met a certain threshold in a predefined time period may be reported. The thresholds may be associated with a number of electronic mail messages in the thread, a number of participants in the thread, a size of electronic mail messages in the thread, etc.

For example, in one embodiment, three threads may exceed a particular threshold in a predetermined time period based on a number of electronic mail messages in such threads. If user 'A' is a participant, in two of the three threads, the number of times 'A' has been associated with a thread that has met the particular threshold in that predetermined time period is two. Thus, the value two may thus be reported with respect to user 'A'. To this end, for each of a plurality of different types of thresholds (e.g. associated with different aspects of threads), a number of threads communicated by a user meeting such thresholds may be reported via the user statistics report.

In use, the action may optionally be performed for improving a work environment. For example, excessively long threads may result in reduced productivity and may negatively impact the working relationships existing between employees participating in a thread. Alerting a manager of an excessively long thread, blocking an electronic mail message from a thread deemed nonproductive, deleting old electronic mail messages from an overly long thread, and/or performing any other actions based on an aspect of a thread may assist in reducing or eliminating inefficiencies in the workplace and increasing employee productivity.

In addition, if an organization has a culture of discussing and deciding all aspects of the organization through threads, such culture may he detected through analysis of the threads and may optionally he reported to management. Management may thus identify the existence of such a culture, and therefore take actions to correct or modify the organizational environment to overcome such culture.

Figure 6:
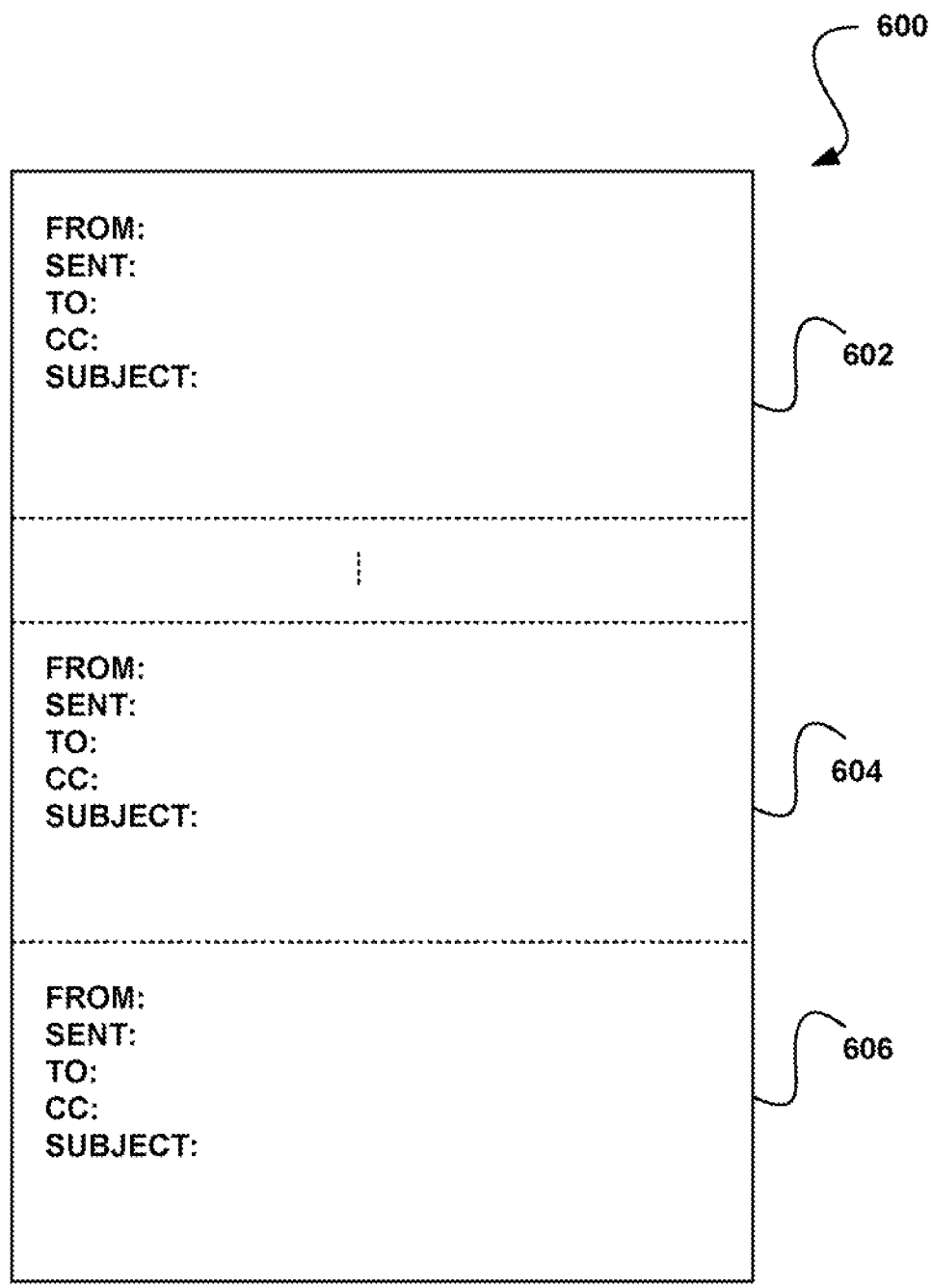
FIG. 6 shows a thread associated with electronic mail messages, in accordance with still yet another embodiment.

FIG. 6 shows a thread 600 associated with electronic mail messages, in accordance with still yet another embodiment. As an option, the thread 600 may be the subject of analysis in the context of the architecture and environment of FIGS. 1-5. It should also be noted that the aforementioned definitions may apply during the present description.

As shown, the thread 600 includes multiple electronic mail messages 602, 604, and 606. Each electronic mail message 602, 604, and 606 may include a source field, a date field, a recipient field, a "CC" field, a subject field, a body (e.g. of text, etc.), an attachment, etc. Further, the electronic mail messages 602, 604, and 606 may be included within the thread in sequence. For example, an original electronic mail message 606 may be included last (i.e. at the bottom) of the thread 600, whereas an electronic mail message 604 sent in reply to the original electronic mail message 606 may be included above the original electronic mail message 606, and so on.

In one embodiment, any one of the electronic mail messages 602, 604, 606 may be removed from the thread 600. For example, any of the electronic mail messages 602, 604, 606 may be removed when a number of the electronic mail messages 602, 604, 606 associated with the thread 600 meets a predetermined threshold.

Just by way of example, if it is determined that a latest electronic mail message 602 contains the content of previously communicated electronic mail messages 604 and 606, the previously communicated electronic mail messages 604 and 606 may be removed from the thread 600. This may increase the efficiency and capacity of one or more devices storing the thread 600, and may also optionally simplify locating information in the thread 600 by one or more users receiving the thread.

Further, the contents of electronic mail messages 602, 604, and 606 may be used in determining an aspect of the thread 600. For example, the "FROM:," "TO:," and "CC:" fields may be analyzed to determine a number of participants associated with the thread 600. Additionally, the body of electronic mail messages 602, 604, and 606 may be analyzed in order to determine whether one electronic mail message 602, 604, or 606 in the thread 600 contains the body of one or more other electronic mail messages 602, 604, and/or 606 in the thread 600.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    identifying one or more aspects of a thread associated with a plurality of electronic mail messages, wherein the one or more aspects include a size of the thread and a weighted number of participants in the thread and identifying the one or more aspects comprises determining the weighted number of participants in the thread, the weighted number of participants is determined from weightings assigned to each unique address in the thread, and the weighting for a participant is to be assigned based at least in part on:
        whether the respective participant is addressed directly in the thread or addressed by carbon copy (CC) in the thread, wherein carbon copy participants are to receive a lower weighting compared to participants addressed directly in the thread, and
        whether respective participant has actively responded to at least some of the mail messages of the thread;
    comparing each of the one or more aspects to a respective predetermined threshold for the aspect;

identifying that at least the particular one of the one or more aspects exceeds the threshold corresponding to the particular aspect; and performing an action, in conjunction with a processor, based at least in part on identifying that at least the particular aspect of the thread exceeds the corresponding threshold.

2. The method of claim 1, wherein the action includes determining whether an excessive amount of participants are associated with the thread.

3. The method of claim 1, wherein the aspect of the thread includes a number of the electronic mail messages associated with the thread.

4. The method of claim 1, wherein the action includes sending an electronic mail message notification.

5. The method of claim 4, wherein the electronic mail message notification is sent to a predetermined electronic mail address.

6. The method of claim 4, wherein the electronic mail message notification is sent to at least one participant associated with the thread.

7. The method of claim 1, wherein the action includes logging the aspect.

8. The method of claim 1, wherein the action includes removing at least a portion of the thread.

9. The method of claim 8, wherein the portion of the thread includes at least one of the electronic mail messages.

10. The method of claim 8, wherein the portion of the thread is temporarily stored.

11. The method of claim 1, wherein the action includes preventing communication of an additional electronic mail message in association with the thread.

12. The method of claim 1, wherein the action is tailored based on the weighted number of participants associated with the thread.

13. The method of claim 1, wherein the action is performed for improving a work environment.

14. The method of claim 1, wherein the size of the thread includes a physical size of the thread in kilobytes.

15. The method of claim 1, wherein the size of the thread is based on sizes of the associated electronic mail messages.

16. The method of claim 1, wherein the weighted number of participants is based on a number of participants of a latest electronic mail message associated with the thread.

17. The method of claim 1, wherein the weighted number of participants is based on a number of participants added to the thread.

18. The method of claim 1, wherein the weighted number of participants is based on a number of participants removed from the thread.

19. The method of claim 1, wherein the thread includes a first electronic mail message and a second electronic message communicated in response to the first electronic mail message.

20. The method of claim 1, wherein the action results in saving storage space.

21. The method of claim 1, wherein the action results in saving time spent by participants of the thread searching for information therein.

22. The method of claim 1, wherein the one or more aspects further include a number of words in the electronic mail messages associated with the thread, wherein the action is prevented if any one of the participants matches a predetermined participant.

23. A computer program product embodied on a non-transitory computer readable storage medium for performing operations, comprising:

identifying one or more aspects of a thread associated with a plurality of electronic mail messages, wherein the one or more aspects include a size of the thread and a weighted number of participants in the thread and identifying the one or more aspects comprises determining the weighted number of participants in the thread, the weighted number of participants is determined from weightings assigned to each unique address in the thread, and the weighting for a participant is to be assigned based at least in part on:

whether the respective participant is addressed directly in the thread or addressed by carbon copy (CC) in the thread, wherein carbon copy participants are to receive a lower weighting compared to participants addressed directly in the thread, and whether respective participant has actively responded to at least some of the mail messages of the thread;

comparing each of the one or more aspects to a respective predetermined threshold for the aspect;

identifying that at least the particular one of the one or more aspects exceeds the threshold corresponding to the particular aspect; and performing an action, in conjunction with a processor, based at least in part on identifying that at least the particular aspect of the thread exceeds the corresponding threshold.

24. A system, comprising:

a processor, wherein the system is configured for:

identifying one or more aspects of a thread associated with a plurality of electronic mail messages, wherein the one or more aspects include a size of the thread and a weighted number of participants in the thread and identifying the one or more aspects comprises determining the weighted number of participants in the thread, the weighted number of participants is determined from weightings assigned to each unique address in the thread, and the weighting for a participant is to be assigned based at least in part on:

whether the respective participant is addressed directly in the thread or addressed by carbon copy (CC) in the thread, wherein carbon copy participants are to receive a lower weighting compared to participants addressed directly in the thread, and whether respective participant has actively responded to at least some of the mail messages of the thread;

comparing each of the one or more aspects to a respective predetermined threshold for the aspect;

identifying that at least the particular one of the one or more aspects exceeds the threshold corresponding to the particular aspect; and performing an action, in conjunction with the processor, based at least in part on identifying that at least the particular aspect of the thread exceeds the corresponding threshold.

25. The system of claim 24, further comprising memory coupled to the processor via a bus.

* * * * *